United States Patent
Barger et al.

(10) Patent No.: US 7,381,279 B2
(45) Date of Patent: Jun. 3, 2008

(54) ARTICLE FOR DEIONIZATION OF WATER

(75) Inventors: Bruce Barger, West Chester, OH (US); Carlos Antonio Barea, Cincinnati, OH (US); Alan Scott Goldstein, Blue Ash, OH (US); Phillip Kyle Vinson, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 187 days.

(21) Appl. No.: 10/137,748

(22) Filed: May 2, 2002

(65) Prior Publication Data

US 2003/0034051 A1 Feb. 20, 2003

Related U.S. Application Data

(63) Continuation-in-part of application No. 10/022,027, filed on Dec. 13, 2001, which is a continuation-in-part of application No. 09/972,090, filed on Oct. 5, 2001, now Pat. No. 6,562,142, which is a continuation-in-part of application No. 09/950,757, filed on Sep. 11, 2001, now Pat. No. 6,846,512, which is a continuation-in-part of application No. 09/875,311, filed on Jun. 6, 2001.

(60) Provisional application No. 60/265,059, filed on Jan. 30, 2001.

(51) Int. Cl.
*B08B 7/04* (2006.01)

(52) U.S. Cl. .............. 134/10; 134/26; 134/34; 134/36; 134/41; 137/268; 239/310

(58) Field of Classification Search .............. 137/268; 239/310; 134/10, 26, 34, 36, 41
See application file for complete search history.

(56) References Cited

U.S. PATENT DOCUMENTS

| 1,872,058 | A | 8/1932 | Bramsen et al. |
|---|---|---|---|
| 2,078,543 | A | 4/1937 | Salisbury |
| D110,841 | S | 8/1938 | Tobler |
| 2,772,120 | A | 11/1956 | Olson |
| 2,801,941 | A | 8/1957 | Johnson |
| 3,339,841 | A | 9/1967 | Beach, Jr. |
| 3,355,018 | A | 11/1967 | Smith |
| 3,382,177 | A | 5/1968 | Woodruff |
| 3,459,334 | A | 8/1969 | Evans |
| 3,464,631 | A | 9/1969 | Liefring et al. |
| 3,507,798 | A | 4/1970 | Egan et al. |

(Continued)

FOREIGN PATENT DOCUMENTS

DE A-2161591 6/1973

(Continued)

*Primary Examiner*—Sharidan Carrillo
(74) *Attorney, Agent, or Firm*—Jeffrey V. Bamber; Mark A. Charles; Kim William Zerby

(57) ABSTRACT

An article of manufacture, a system, and a method for at least partially deionizing water, including but not limited to converting tap water into essentially deionized water that can be used for numerous purposes including, but not limited to cleaning and/or treating surfaces, including surfaces such as ceramic, steel, plastic, glass and/or painted surfaces such as the exterior surface of a vehicle, is disclosed.

13 Claims, 4 Drawing Sheets

U.S. PATENT DOCUMENTS

| | | | |
|---|---|---|---|
| 3,658,590 A | 4/1972 | Huebner et al. | |
| 3,658,712 A | 4/1972 | Lindner et al. | |
| 3,753,899 A | 8/1973 | Kunin et al. | |
| 3,776,850 A | 12/1973 | Pearson et al. | |
| 3,784,457 A * | 1/1974 | Mizutani et al. | 204/529 |
| D235,872 S | 7/1975 | Harussi | |
| 3,911,938 A | 10/1975 | Wiltrout | |
| 3,915,738 A | 10/1975 | Willard, Sr. | |
| 3,928,065 A | 12/1975 | Savino | |
| 3,940,069 A | 2/1976 | Gunzel, Jr. et al. | |
| 3,954,644 A | 5/1976 | Krezanoski et al. | |
| D252,097 S | 6/1979 | Probst et al. | |
| 4,182,676 A * | 1/1980 | Casolo | 210/669 |
| 4,235,972 A * | 11/1980 | Jones | 521/28 |
| 4,242,201 A | 12/1980 | Stephens et al. | |
| 4,253,842 A | 3/1981 | Ehrlich | |
| 4,294,729 A | 10/1981 | Bakos et al. | |
| 4,307,840 A | 12/1981 | Schulze et al. | |
| 4,368,146 A | 1/1983 | Aronson et al. | |
| 4,442,003 A | 4/1984 | Holt | |
| 4,475,689 A | 10/1984 | Hauger et al. | |
| 4,591,449 A | 5/1986 | Goedhart et al. | |
| 4,597,886 A | 7/1986 | Goedhart et al. | |
| 4,628,644 A | 12/1986 | Somers | |
| 4,715,391 A | 12/1987 | Scheller | |
| 4,752,034 A | 6/1988 | Kuhn et al. | |
| 4,754,928 A | 7/1988 | Rogers et al. | |
| 4,764,047 A | 8/1988 | Johnston et al. | |
| 4,785,850 A | 11/1988 | Sanchez | |
| 4,901,923 A | 2/1990 | McRoskey et al. | |
| 4,904,383 A * | 2/1990 | Auerswald | 210/269 |
| 4,967,960 A | 11/1990 | Futrell | |
| 4,969,603 A | 11/1990 | Norman | |
| 5,057,152 A | 10/1991 | Marcus et al. | |
| 5,076,935 A * | 12/1991 | Kraus et al. | 210/651 |
| 5,098,023 A | 3/1992 | Burke | |
| 5,110,479 A | 5/1992 | Frommer et al. | |
| 5,192,025 A | 3/1993 | Hu et al. | |
| 5,238,595 A | 8/1993 | Crutcher et al. | |
| 5,332,158 A | 7/1994 | Styne et al. | |
| 5,429,867 A | 7/1995 | McCarthy et al. | |
| D364,673 S | 11/1995 | Gustafsson | |
| 5,562,824 A | 10/1996 | Magnusson | |
| 5,595,345 A | 1/1997 | Chura et al. | |
| 5,595,451 A | 1/1997 | Harrison, Jr. | |
| 5,630,548 A | 5/1997 | Chih | |
| 5,647,977 A | 7/1997 | Arnaud | |
| 5,662,273 A | 9/1997 | Chih | |
| 5,681,463 A | 10/1997 | Shimizu et al. | |
| 5,721,306 A | 2/1998 | Tsipursky et al. | |
| 5,758,825 A | 6/1998 | Hsu | |
| 5,759,980 A | 6/1998 | Russo et al. | |
| 5,782,988 A | 7/1998 | Whatley, Sr. | |
| 5,830,360 A | 11/1998 | Moyazani | |
| 5,850,973 A | 12/1998 | Lijeqvist et al. | |
| 5,853,809 A | 12/1998 | Campbell et al. | |
| 5,962,388 A | 10/1999 | Sherry et al. | |
| 5,964,415 A | 10/1999 | Hadar | |
| 6,016,977 A | 1/2000 | Farley | |
| D422,055 S | 3/2000 | Stansy et al. | |
| 6,113,797 A * | 9/2000 | Al-Samadi | 210/652 |
| 6,125,860 A | 10/2000 | DeSebastian | |
| 6,158,258 A | 12/2000 | Bowman | |
| 6,225,434 B1 | 5/2001 | Sadvary et al. | |
| 6,264,119 B1 | 7/2001 | Truong | |
| 6,267,891 B1 * | 7/2001 | Tonelli et al. | 210/652 |
| 6,284,124 B1 | 9/2001 | DiMascio et al. | |
| 6,342,473 B1 | 1/2002 | Kott et al. | |
| 6,369,019 B1 | 4/2002 | Gordon et al. | |
| 6,375,094 B1 | 4/2002 | Schroeder et al. | |
| 6,378,789 B1 | 4/2002 | Seaman, Jr. et al. | |
| 6,484,735 B1 | 11/2002 | Gordon et al. | |
| 6,520,190 B2 | 2/2003 | Thompson et al. | |
| 6,527,196 B1 | 3/2003 | Ehrick et al. | |
| 6,537,957 B1 | 3/2003 | Cardola et al. | |
| 6,562,142 B2 * | 5/2003 | Barger et al. | 134/6 |
| 6,569,261 B1 | 5/2003 | Aubay et al. | |
| 6,716,805 B1 | 4/2004 | Sherry et al. | |
| 6,846,512 B2 | 1/2005 | Rohrbaugh et al. | |
| 2002/0045010 A1 | 4/2002 | Rohrbaugh et al. | |
| 2002/0046969 A1 | 4/2002 | Bartsch et al. | |
| 2002/0102359 A1 * | 8/2002 | Rohrbaugh et al. | 427/388.4 |
| 2002/0108640 A1 * | 8/2002 | Barger et al. | 134/26 |
| 2002/0144712 A1 * | 10/2002 | Barger et al. | 134/6 |
| 2002/0160224 A1 * | 10/2002 | Barger et al. | 428/689 |
| 2002/0160924 A1 | 10/2002 | Bertrem et al. | |
| 2002/0176982 A1 | 11/2002 | Rohrbaugh et al. | |
| 2002/0185420 A1 | 12/2002 | Horstmann et al. | |
| 2003/0017960 A1 | 1/2003 | Bertrem et al. | |
| 2003/0034051 A1 * | 2/2003 | Barger et al. | 134/10 |

FOREIGN PATENT DOCUMENTS

| | | |
|---|---|---|
| DE | 38 14726 A1 | 9/1989 |
| EP | 0 467 472 A2 | 1/1992 |
| EP | 0 497 632 A | 8/1992 |
| EP | 0 368 101 B1 | 1/1994 |
| EP | 0 808 662 A2 | 11/1997 |
| EP | 0 859 045 A1 | 8/1998 |
| EP | 0 859 046 A1 | 8/1998 |
| EP | 0 919 610 A1 | 6/1999 |
| EP | 1 158 033 A1 | 11/2001 |
| GB | 1376379 | 12/1974 |
| GB | 2297901 | 8/1996 |
| GB | 2 303373 A | 2/1997 |
| JP | 3-127684 | 5/1991 |
| JP | 03-169540 | 7/1991 |
| JP | 04-353438 | 12/1992 |
| JP | 07-268674 | 10/1995 |
| JP | 08-053558 A | 2/1996 |
| JP | 08266956 | 10/1996 |
| WO | WO95/00611 A1 | 1/1995 |
| WO | WO97/03180 A1 | 1/1997 |
| WO | WO97/33963 A1 | 9/1997 |
| WO | WO97/43373 A1 | 11/1997 |
| WO | WO97/48927 A1 | 12/1997 |
| WO | WO9801223 * | 1/1998 |
| WO | WO99/00457 A1 | 1/1999 |
| WO | WO99/20724 A1 | 4/1999 |
| WO | WO99/23194 A1 | 5/1999 |
| WO | WO 00/00554 A1 | 1/2000 |
| WO | WO 00/77138 A1 | 12/2000 |
| WO | WO 00/77143 A1 | 12/2000 |
| WO | WO 00/77144 A1 | 12/2000 |
| WO | WO 01/05920 A1 | 1/2001 |
| WO | WO 01/27236 A1 | 4/2001 |
| WO | WO 01/32820 A1 | 5/2001 |
| WO | WO 01/96036 A1 | 12/2001 |
| WO | WO 01/96511 A2 | 12/2001 |
| WO | WO 01/96512 A2 | 12/2001 |
| WO | WO 01/96516 A1 | 12/2001 |
| WO | WO2001-096516 * | 12/2001 |

* cited by examiner

ARTICLE FOR DEIONIZATION OF WATER

CROSS REFERENCE TO RELATED PATENT APPLICATIONS

This application is a continuation-in-part of U.S. patent application Ser. No. 10/022,027 filed on Dec. 13, 2001, which is a continuation-in-part of U.S. patent application Ser. No. 09/972,090 filed on Oct. 5, 2001, now, U.S. Pat. No. 6,562,142 which is a continuation-in-part of U.S. patent application Ser. No. 09/950,757 filed on Sep. 11, 2001, now, U.S. Pat. No. 6,846,512 which is a continuation-in-part of U.S. patent application Ser. No. 09/875,311, filed on Jun. 6, 2001, which claims the benefit of the filing date of PCT international patent application US00/16349 filed on Jun. 14, 2000; U.S. patent application Ser. No. 09/876,363, filed on Jun. 7, 2001, now abandoned, which claims the benefit of the filing date of provisional U.S. Patent application No. 60/265,059, filed on Jan. 30, 2001; and U.S. patent application Ser. No. 09/828,014 filed on Apr. 6, 2001 now abandoned.

FIELD OF THE INVENTION

The present invention relates to an article of manufacture, a system, and a method for at least partially deionizing water, including but not limited to converting tap water into essentially deionized water that can be used for numerous purposes including, but not limited to cleaning and/or treating surfaces, including surfaces such as ceramic, steel, plastic, glass and/or painted surfaces such as the exterior surfaces of a vehicle.

BACKGROUND OF THE INVENTION

Products for cleaning hard surfaces are widely available on the market. These products are used for two purposes, the first being to clean soil from the surface and the second being to leave the surface with an aesthetically pleasing finish e.g. spot-free or shiny. However, products available on the market often require rinsing with water after use. Typically when the water dries from the surface water-marks, smears or spots are left behind. These water-marks, it is believed may be due to the evaporation of water from the surface leaving behind deposits of minerals which were present as dissolved solids in the water, for example calcium, magnesium and sodium ions and salts thereof or may be deposits of water-carried soils, or even remnants from a cleaning product, for example soap scum. This problem is often exacerbated by some cleaning compositions which modify the surface during the cleaning process in such a way that after rinsing, water forms discrete droplets or beads on the surface instead of draining off. These droplets or beads dry to leave consumer noticeable spots or marks known as water-marks. This problem is particularly apparent when cleaning ceramic, steel, plastic, glass or painted surfaces. A means of solving this problem, known in the art is to dry the water from the surface using a cloth or chamois before the water-marks form. However, this drying process is time consuming and requires considerable physical effort.

PCT Publication WO 97/48927 is directed to a cleaning composition, method, and apparatus for cleaning exterior windows. This publication states that it discloses a no scrub/no wipe method for cleaning exterior windows without filming or spotting. A spray gun comprising separate chambers for a cleaning composition and an ion exchange resin is disclosed. The method involves spraying a cleaning composition on the window surface, preparing purified rinse water by passing the rinse water through the ion exchange resin and rinsing the window surface with the purified rinse water.

PCT Publication WO 98/01223 is directed to a lightweight portable device for converting tap water into a spray of demineralized water. This publication states that it discloses a device for producing a controlled spray of deionized water, useful for rinsing cars and windows. This publication further states that the prior art has failed to provide teachings of a lightweight and readily portable, economical device and method for "real time" conversion of tap water into demineralized water which can be used to, among other things, rinse surfaces after cleaning without leaving water spots if the surface is not wiped dry.

A web site for All Water.com discloses wall mounted ion exchange cartridge systems comprising "high capacity" mixed bed ion exchange cartridge systems.

The devices disclosed in these publications and on this web site, however, are believed to suffer from a number of deficiencies, including but not limited to: that they are still not light weight and compact enough for some uses; that the water discharged from the same may still leave undesirable residues when it is sprayed or otherwise applied to a surface; and, that the flow rate through such devices is not as high as may be desirable, or the water quality and volume of desirable water is adversely affected at the desirable high flow rates.

SUMMARY OF THE INVENTION

The present invention relates to an article of manufacture, a system, and a method for at least partially deionizing water, including but not limited to converting tap water into essentially deionized water. The article, system, and method can be used for numerous purposes including, but not limited to cleaning and/or treating surfaces, including surfaces such as ceramic, steel, plastic, glass and/or painted surfaces such as the exterior surface of a vehicle.

There are numerous embodiments of the article of manufacture, system, and method, all of which are intended to be non-limiting examples of the article, system, and method of the present invention. In one non-limiting embodiment, the article of manufacture comprises a purifying device for use in an end of the hose water purifier, and the purifying device comprises a structure where the water flows through a sequential or mixed bed arrangement of at least two of the following types of ion exchange resins: WAC/SAC/WBA/SBA ion exchange resins at a flow rate of greater than or equal to about 14 gallons/minute/ft$^3$ (about 1.9 liters/minute/liter) of the total volume of ion exchange resin, preferably greater than or equal to about 20 gallons/minute/ft$^3$ (about 2.7 liters/minute/liter).

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

I. Introduction

The present invention relates to an article of manufacture, a system, and a method for at least partially deionizing water, including but not limited to converting tap water into essentially deionized water.

The article, system, and method can be used for numerous purposes including, but not limited to cleaning and/or treating surfaces, including surfaces such as ceramic, steel, plastic, glass and/or painted surfaces such as the exterior surface of a vehicle. The term "surface" includes those surfaces typically found in houses like kitchens and bathrooms, e.g., floors, walls, tiles, windows, sinks, baths, showers, toilets, fixtures and fittings made of different materials like ceramic, porcelain, enamel, and vinyl, no-wax vinyl, linoleum, melamine, glass, any plastics, plastified wood, metal, especially steel and chrome metal, varnished or sealed surfaces and especially, the exterior surfaces of a vehicle, e.g. painted, plastic or glass surfaces and finishing coats. The article, system, and method may be particularly useful for deionizing tap water at the point of use. In addition to cleaning and/or rinsing surfaces, the article, system, and method can be used for numerous other purposes including, but not limited to: humidifying air, drinking, watering plants, preparing solutions/dispersions, washing jewelry, as an electrical circuit switch, for bird baths, hydraulics, laboratory use, environmental and humidity chambers, ice machines, steaming equipment, filling lead acid batteries, photo processing and printing, manufacturing electronic articles, cleaning electronic equipment, and hydroponic gardening, etc.

II. The Article of Manufacture

A. The Purifier

Figure 1:
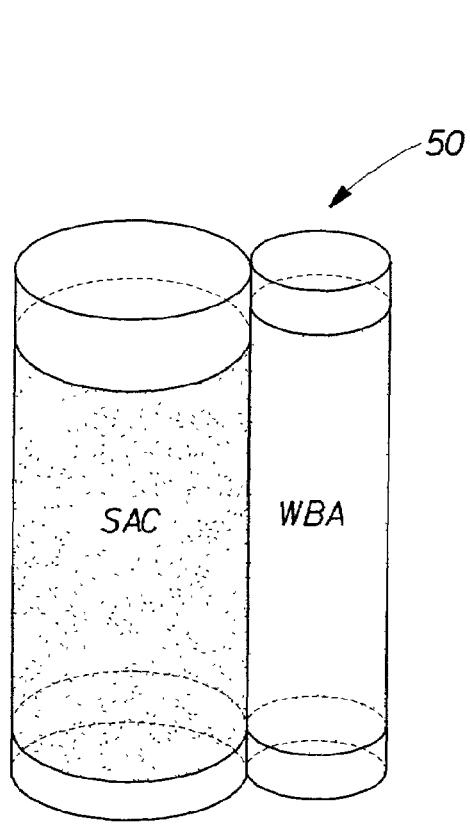
FIG. 1 is a perspective view of one non-limiting embodiment of a water purifier according to the present invention.

FIG. 1 shows one non-limiting embodiment of a purifier 50 that can comprise the article of manufacture. The purifier can be in any suitable configuration. In some embodiments, the purifier 50 is portable. It can also be hand held. The purifier 50 can be incorporated into any suitable structure, such as in the form of a cartridge 52 shown in FIG. 2. The purifier can be permanent or replaceable. In one non-limiting embodiment, the purifier can be of a type that is removeably attachable to the end of a garden hose. Preferably, however, in the embodiment shown in the following drawing figures, the purifier 50 is of a type that is incorporated into the sprayer 20 (shown in FIGS. 6 and 7) that is attached to a garden hose 24.

This purifier 50 shown is a generally cylindrical purifier. In the non-limiting embodiment shown, the purifier is in the form of a structure comprised of two cylindrical portions that are joined together along their axes to form a compound cylindrical structure with a cross-section that resembles the figure "8". The purifier 50 can be inserted into and removed from the sprayer housing 22 through an opening 54 in the lower portion 20B of the sprayer 20. In one non-limiting embodiment, the purifier 50 comprises an ion exchange medium such as an ion exchange resin purifier for removing dissolved ions including cations such as Ca, Mg, and Na, and anions such as $SO_4$, $NO_3$, and Cl, from the water.

The ion exchange resin is selected from the group of strong acid cation (SAC), strong base anion (SBA), weak acid cation (WAC) and weak base anion (WBA) ion exchange resins. Strong acid or strong base ion exchange resins are those which comprise a strong acid or base functionality. A strong acid or strong base functionality are those which have a pKa or pKb, respectively, of higher than 2.5. A weak acid or base functionality is defined by a pKa or pKb, respectively, of less than 2.5. The purifying material may, in certain embodiments, comprise a mixture of two, or more different ion exchange resins, or more preferably, comprises layers of two or more different ion exchange resins. In certain preferred embodiments, the purifier comprises at least an SAC ion exchange resin and a WBA ion exchange resin. The purifier 50 can optionally comprise any of the other ion exchange resins described herein.

Figure 2:
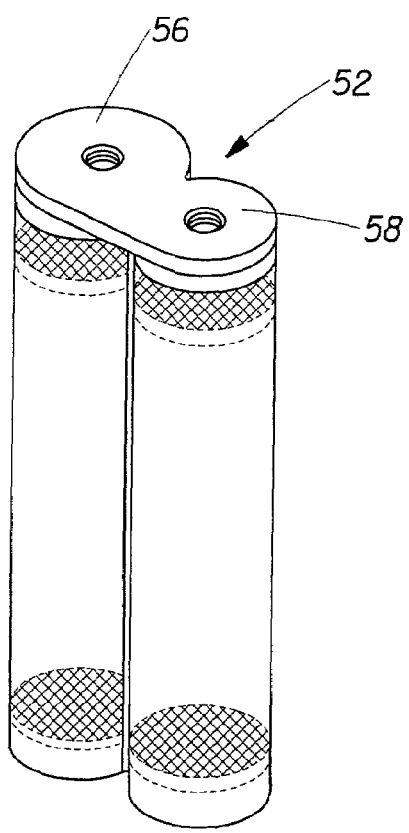
FIG. 2 is a perspective view of a cartridge for the water purifier shown in FIG. 1.

In one non-limiting embodiment, the purifying device comprises two different ion exchange resins. In one variation of such an embodiment, the purifying device can comprise an SAC ion exchange resin and a WBA ion exchange resin. FIGS. 1 and 2 show one possible arrangement of these ion exchange resins. As shown in FIG. 2, the purifying device can comprise a cartridge 52 having two compartments of different size 56 and 58. The larger compartment 56 can contain the SAC resin, and the smaller compartment 58 can contain the WBA resin. In other embodiments, however, the types of resin in the compartments could be reversed if lower capacity WBA resin is used. The different sized compartments contain the relatively larger amount of SAC ion exchange resin required and the relatively smaller amount of WBA ion exchange resin required. The compartments can differ in size due to differences in the size of their cross-sections (e.g., diameter in the case of cylindrical compartments) and/or their length, or aspect ratio (ratio of largest dimension to smallest dimension (e.g., in the case of a cylindrical cartridge, the length of the cartridge divided by the diameter of the cartidge). There is preferably a flow path, such as in the form of a channel, between the compartments, and the different ion exchange resins can have elements for containing the resin, such as the resin containment pieces shown.

The purifier 50 can be of any suitable size. In some embodiments, the purifier 50 is relatively small in comparison to prior types of purifiers. In certain embodiments, the purifier 50 may be considered to be miniaturized. The size of the purifier 50 can be expressed in terms of its dimensions, or in terms of the volume of ion exchange resin therein. For some embodiments, the dimensions of the purifier 50 (in terms of the dimensions of the ion exchange resin used therein) can be calculated using the following mathematical model:

$$DI\ Water\ (gallons) = \alpha + (\beta \times A) + (\chi \times L) + (\delta \times F) + (\epsilon \times A \times L) + \phi(A \times F)$$

where: A=Area of the purifier, internal (inches$^2$)
L=Length of the purifier, internal (inches)
F=Water flow rate through purifier (gallons/minute)
Where the SAC is IONAC® C-266 H FM from Sybron, or equivalent
Where the WBA is IONAC® A-365 from Sybron, or equivalent, and:
the flow rate and dimensions of the ion exchange resin in the purifier are within the following ranges:

F is between 0.25 and 0.41 gallons/minute

For the SAC ion exchange resin: L is between 5 and 7 inches; and for a cylindrical volume of ion exchange resin, the diameter of the cross-section is between 1.135 inches and 1.45 inches.

For the WBA ion exchange resin: L is between 4 and 6 inches; and for a cylindrical volume of ion exchange resin, the diameter of the cross-section is between 1.135 inches and 1.45 inches.

and the multiplication factors are provided in the following table:

|  | $\alpha$ | $\beta$ | $\chi$ | $\delta$ | $\epsilon$ | $\phi$ | $\gamma$ |
|---|---|---|---|---|---|---|---|
| SAC | −0.22968 | −0.33667 | −0.20799 | 0.79143 | 1.17665 | −3.46935 |  |
| WBA | 5.51754 | −4.96870 | 0.587 | −14.42188 | 2.98122 | 0 |  |
| PD SAC[1] | −6.1955 | 1.4442 | 0.5238 | 37.5011 | 0 | −14.9159 |  |
| PD WBA[2] | −10.4561 | 1.3835 | 1.4888 | 65.9314 | 0 | 0 | −27.6311 |

[1] Pressure drop through SAC resin.
[2] Pressure drop through WBA resin.

For a selected aspect ratio and flow rate selected within the ranges specified above, the number of deionized gallons produced by the SAC or WBA resin can be independently calculated. Alternatively, for a given amount of deionized water desired, if two of the area, length, or flow rate are selected within the ranges specified above, the equation allows the remaining variable to be calculated. This is useful to determine amounts of each resin to use in the article for deionization of water.

Pressure drop through the purifier can be measured by the following equation:

$$PD(\text{pounds/in}^2(\text{psi})) = \alpha + (\beta \times A) + (\chi \times L) + (\delta \times F) + \phi(A \times F) + \gamma(L \times F)$$

This pressure drop data can, in some embodiments, be useful in the selection of other components of the invention and/or sprayer to achieve a desired relatively constant flow rate across the range of water pressures encountered, thereby assuring the article performs properly.

The size of the purifier 50 expressed in terms of the volume of ion exchange resin therein may, in some embodiments, be such that the total volume of ion exchange resin is between about 5 in³ (about 82 cc) (cubic centimeters) and about 25 in³ (about 410 cc), preferably between about 10 in³ (about 164 cc) and about 20 in³ (about 328 cc), and more preferably between about 12 in³ (about 197 cc) and about 17 in³ (about 279 cc).

The purifier 50 can be of any suitable weight. In some embodiments, the purifier 50 is relatively light weight in comparison to prior types of purifiers. In certain embodiments, the purifier 50 weighs less than or equal to about 1.1 lb. (500 grams), more preferably about 300 grams in use (when water is passing through the same).

In one embodiment of an ion exchange resin purifier, the purifying material is a mixture of several ion exchange resins or most preferably layers of different ion exchange resins. The purifying device may comprise a random mixture of strong acidic and weak basic ion exchange resins. Alternatively, the purifying device may comprise a sequential bed design of different ion exchange resins. In one non-limiting embodiment, for example, the purifying device may comprise a two resin structure comprising strong acid and weak basic ion exchange resins.

In one non-limiting example, the SAC column of ion exchange resin is about 1.5 inches (about 2.3 cm) in diameter and about 4.75 inches (about 12 cm) in length, and thus has an aspect ratio of about 3.2, and the WBA column is about 1.15 inches (about 2.9 cm) in diameter and about 5.1 inches (about 13 cm) in length, and thus has an aspect ratio of about 4.5, or an overall average aspect ratio of about 7.5 for both columns. In other non-limiting embodiments, the dimensions of the volume of ion exchange resin used can be any dimensions that will fall within the equations set forth above. In operation, the SAC ion exchange resin produces acids such as $H_2SO_4$ and HCl and the WBA ion exchange resin functions as a strong mineral acid absorber. Therefore, in this embodiment, the compartments are preferably arranged so that the water passes through the WBA ion exchange resin compartment after it passes through the SAC ion exchange resin compartment.

Figure 3:
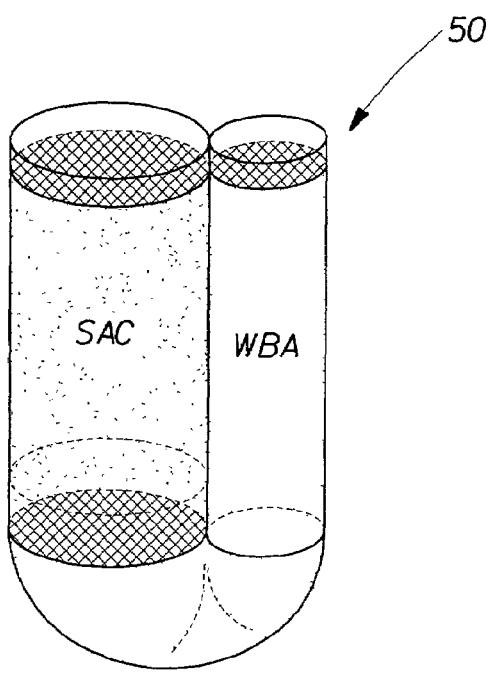
FIG. 3 is a perspective view of an alternative embodiment of a water purifier before use.
Figure 4:
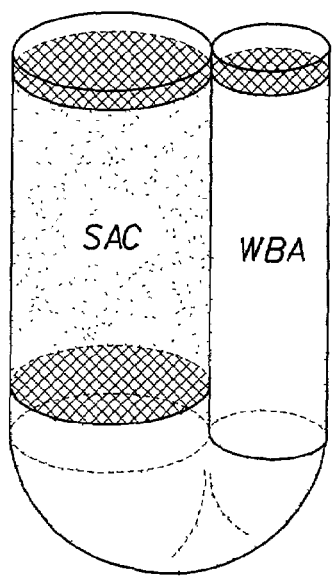
FIG. 4 is a perspective view of the water purifier shown in FIG. 3 after use.
Figure 5:
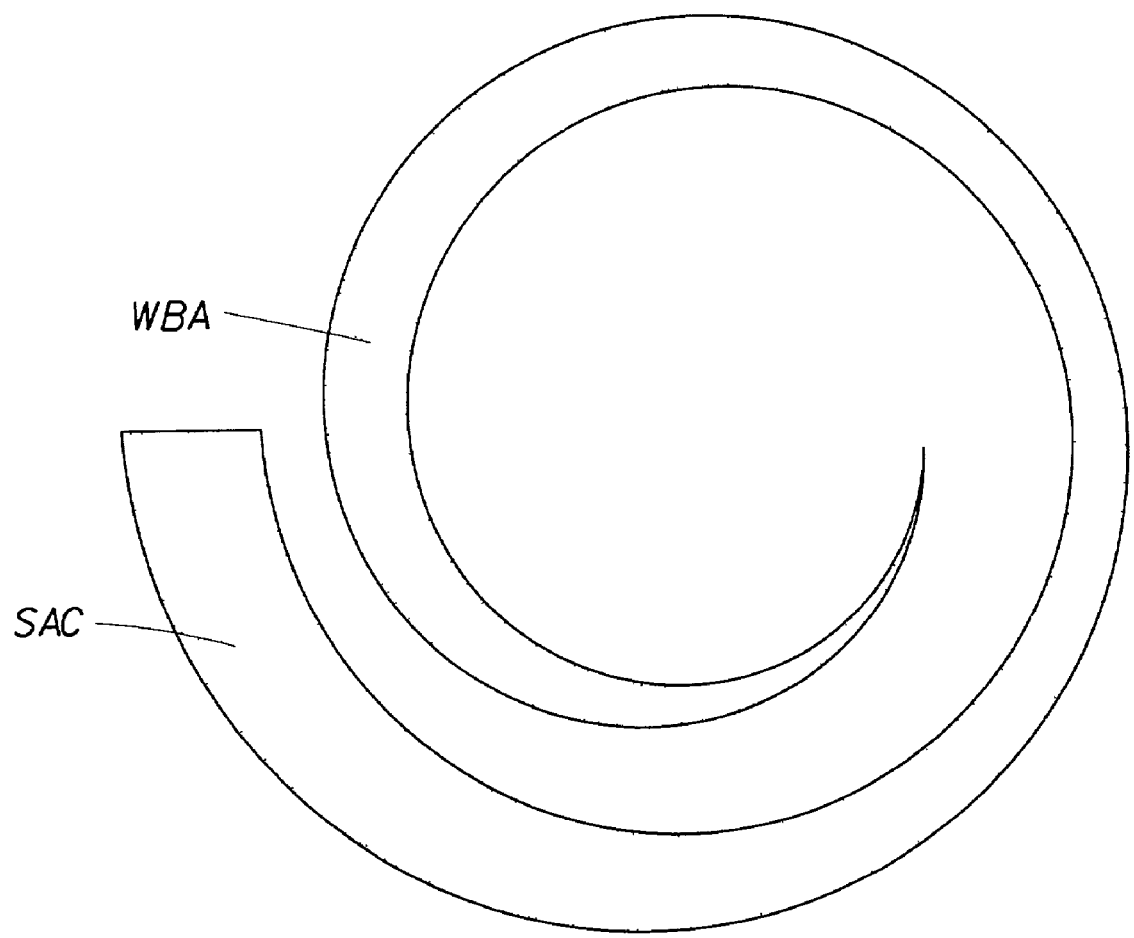
FIG. 5 is a cross-sectional view showing another alternative embodiment of a water purifier in which the ion exchange resins are in a spiral arrangement.

In the case of the embodiment shown in FIG. 1, during use of the purifying device, the volume of the SAC ion exchange resin will decrease, and the volume of the WBA ion exchange resin will increase. As a result, the purifying device may be designed to accommodate these changes in the volume of the ion exchange resins. FIGS. 3 and 4 show one non-limiting example of a structure for the purifying device that will accommodate the changes in the volume of the ion exchange resins, before and after use, respectively. In this embodiment, the compartments or chambers are arranged so that the WBA ion exchange resin can expand into the free space in the compartment originally occupied by the SAC ion exchange resin as the latter's volume decreases. FIG. 5 shows an alternative spiral design. Concentric cylindrical arrangements can also be used. The volume of ion exchange resin need not be provided in a single compartment. In other non-limiting embodiments, for example, the volume of ion exchange resin can be provided in a series (or other arrangements, e.g., in parallel) of multiple cartridges, chambers, etc.

By "SAC ion exchange resin", it is meant a resin that exchanges or removes all types of cations including calcium, magnesium and sodium. Examples of SAC ion exchange resins include, but are not limited to Rohm and Haas IRN77, 1500H obtained from Rohm & Haas of Philadelphia, Pa., USA, PUROLITE™ C100H FM (a sulfonated styrene-divinylbenzene copolymer, H+) obtained from Purolite of Rochester Hills, Mich., USA, and Ionac C-266 H FM (a benzene, diethenyl-, polymer with ethenyl-benzene and ethenylethybenzene sulfonated, H+) ion exchange resin obtained from Sybron Chemicals, Inc. of Birmingham, N.J., USA. By "SBA ion exchange resin", it is meant a resin that exchanges all anions including sulfate, chloride, carbonate, bicarbonate and silicate. Examples of SBA ion exchange resins include, but are not limited to Rohm and Haas 44000H and Purolite A4000H.

By "WAC ion exchange resin", it is meant a resin that selectively removes the hardness ion and other multi-valent and mono-valent cations associated with alkalinity. Examples of WAC ion exchange resins include, but are not limited to Rohm and Haas IRC86 and Purolite C104. By "WBA ion exchange resin", it is meant a resin that selectively removes strong acid anions such as sulfate and chloride. Examples of WBA ion exchange resins include, but are not limited to Rohm and Haas AMBERLITE IRA67 (a modified teriary amine acrylic copolymer), Purolite A830, Sybron Ionic A-365 ion exchange resins (A-365 being a 2-propenoic acid, methylester, polymer with diethenylbenzene, ethenylethylbenzene and 2-propenenitrile, hydrolyzed, reaction products with triethylenetetramine), and Resindion S.r.1 (or Mitsubishi Chemical) RELITE MG1 ion exchange resin (a crosslinked copolymer of acrylate containing amino groups) obtained from Mitsubishi Chemical, Carmel, Ind., USA.

In a preferred embodiment, small particle size resin beads are used for higher ion exchange efficiency. By "small particle size resin beads", it is preferably meant beads of less than 1.0 mm in diameter, more preferably less than 0.6 mm and most preferably less than 0.4 mm in diameter. It is believed that small particle size resin beads provide improved efficiency due to the faster ion exchange kinetics of the smaller particle size resins. The faster kinetics results in greater utilization of the ion exchange capacity. In one non-limiting embodiment, the filter has a volume capacity of no greater than 25 $in^3$ and is suitable for use in a hand-held device. In other non-limiting embodiments, the filter has a volume capacity of at least 4 $in^3$, more preferably at least 6 most preferably at least 8 $in^3$.

The purifying device preferably also comprises a visual indicator of depletion of purifying capacity. In a preferred embodiment, at least one type of resin in the purifying device provides the visual indicator. In a particularly preferred embodiment, the visual indicator is provided by a change in color of a resin. Indicators generally used for acid/base titration can also be used to indicate the depletion of resin exchange capacity. Since many indicators themselves are ionic in nature, ion resins can be prepared in indicator form by treating them with 0.1% solution of the indicator in 95% ethanol. Typical indicators used include phenolphthalein, thymol blue and bromocresol green. The mechanism of the indicator color change on the resin is basically the same as the mechanism in a solution during an acid/base titration. The water trapped in the SAC matrix, for example, is very acidic by nature because of the hydrogen ions. As the hydrogen ions gets exchanged out, the pH slowly rises. Eventually this pH change triggers the color change. Thymol blue, for example, has a transition range between pH 1.2-2.8. Commercially available SAC/SBA mixed bed resins that change color upon exhaustion include Purolite MB400IND (blue regenerated, amber exhausted) and MB400QR (colorless regenerated, red exhausted). An example of a commercially available color change SAC resin is PUROLITE® C100 E-FM-H-IND (Purple regenerated, light amber exhausted). Many resin manufacturers will also dye the resins upon request for specific applications.

In some embodiments, the purifying device 50 may be capable of permitting water to flow through the same at a flow rate greater than or equal to about 14 gallons/minute/$ft^3$ (about 1.9 liters/liter) of the total volume of ion exchange resin, preferably greater than or equal to about 20 gallons/minute/$ft^3$ (about 2.7 liters/minute/liter) of the total volume of ion exchange resin. In other embodiments, the purifying device may be capable of permitting water to flow through the same at a flow rate of greater than or equal to about 27 gallons/minute/$ft^3$ (about 3.6 liters/minute/liter), preferably 37 gallons/minute/$ft^3$ (about 4.9 liters/minute/liter) of the total volume of ion exchange resin.

In some embodiments, the WBA ion exchange resin in the purifying device has a capacity greater than or equal to about 1.1 eq./L (equivalents/liter), preferably greater than or equal to about 1.4, more preferably greater than or equal to about 2, more preferably greater than or equal to about 2.5, and even more preferably greater than or equal to about 3.4, or 3.5 eq./L. In some embodiments, the SAC ion exchange resin in the purifying device has a capacity greater than or equal to about 1.5 eq./L, preferably greater than or equal to about 1.7, and more preferably greater than or equal to about 1.9 eq./L, and most preferably greater than or equal to about 2.4 eq./L.

In some embodiments, the purifying device is capable of generating greater than or equal to about 6.2 gallons of water having a conductivity of less than or equal to about 50 micromho (reciprocal of Ohms) from the test water described herein at a flow rate less than or equal to about 43 gallons/minute/$ft^3$ of resin. At a flow rate of about 20 gallons/minute/$ft^3$ gailons/minute/$ft^3$ of resin, the purifying device can generate greater than or equal to about 8.5 gallons of water with the specified conductivity, flow rates between 20 and 43 gallons/minute/$ft^3$ of resin would generate between about 6.2 and 8.5 gallons of water with the specified conductivity. The measurement of conductivity of the water that passes through the purifier is believed to be a better measure than simply measuring hardness in terms of CaCO, (e.g., below 30 ppm CaCO,) because such a hardness level could still allow certain substances, including but not limited to Na (e.g., NaCl) to pass through at levels that can leave unacceptable residues on surfaces (if the purifier is used to purify water that is applied to surfaces). Measuring conductivity also ha.s the advantage of ensuring that the water has a more neutral pH.

Depending on the embodiment, the purifier may provide various advantages. It should be understood, however, that the purifier need not provide all of these advantages, and only the advantages that are specifically set forth in the appended claims, if any, are required to be present in the claimed invention. The purifier may be more compact than some prior devices (for example, in one embodiment, the purifier may be about 6 inches (about 15 cm) long and contain about 13.5 $in^3$ (about 220 cc) of ion exchange resin). In addition, in some embodiments, the water may be passed through the purifier at higher flow rates per volume of resin (for example, in one embodiment, the above compact purifier may provide sufficient deionization at a flow rate of between about 0.27 and about 0.39 gallons/minute (about 1 - about 1.5 L/minute). This would correspond to a flow rate per volume of resin of between about 35 and about 50 gallons/minute/$ft^3$ (about 4.6 to about 6.6 liters/minute/liter) of resin.

B. The Spray Device

The spray device 20 can be in any suitable configuration. The type of spray device can range from very simple connections to a tap water source to more complex devices. Spray devices could have a single flow path, multiple flow paths, reservoirs and associated delivery systems (orifice meters or venturi) for cleaning compositions or treating compositions. The spray device may be hand held, or it may comprise at least a portion that is attached to or supported by the user's body or clothing (including, but not limited to the user's belt, or in the form of a backpack), or a portion of the device may rest on the ground, or on a mobile platform such as a cart. FIGS. 1 and 2 show one non-limiting embodiment of an ergonomically-designed, hand-held hose-end sprayer 20 that can be used in the system and method of the present invention. It should be understood that the system and method of the present invention are not limited to use with the embodiment of the sprayer shown in the drawings, and that many other types of sprayers, or other types of applicators, can be used.

In a preferred embodiment of the present invention, the cleaning composition is applied to the surface using a spray dispenser which is specifically designed to attach to a hose, for example, a conventional garden hose. Such spray dispensers are commonly referred to in the trade as Venturi or hose-end systems. The sprayer head includes an aperture over which water from the garden hose passes to mix with the cleaning composition from the container. In a preferred embodiment of the present process, the spray dispenser used encompasses a switch or valve system allowing the user to not only spray cleaning composition, but also spray water and/or purified rinse water to rinse the car. In a particularly preferred embodiment, the spray dispenser also comprises a purifying device, such as a deionizer. Water can, thus, be channeled though the purifying device to prepare the water for a rinse of purified rinse water.

Figure 6:
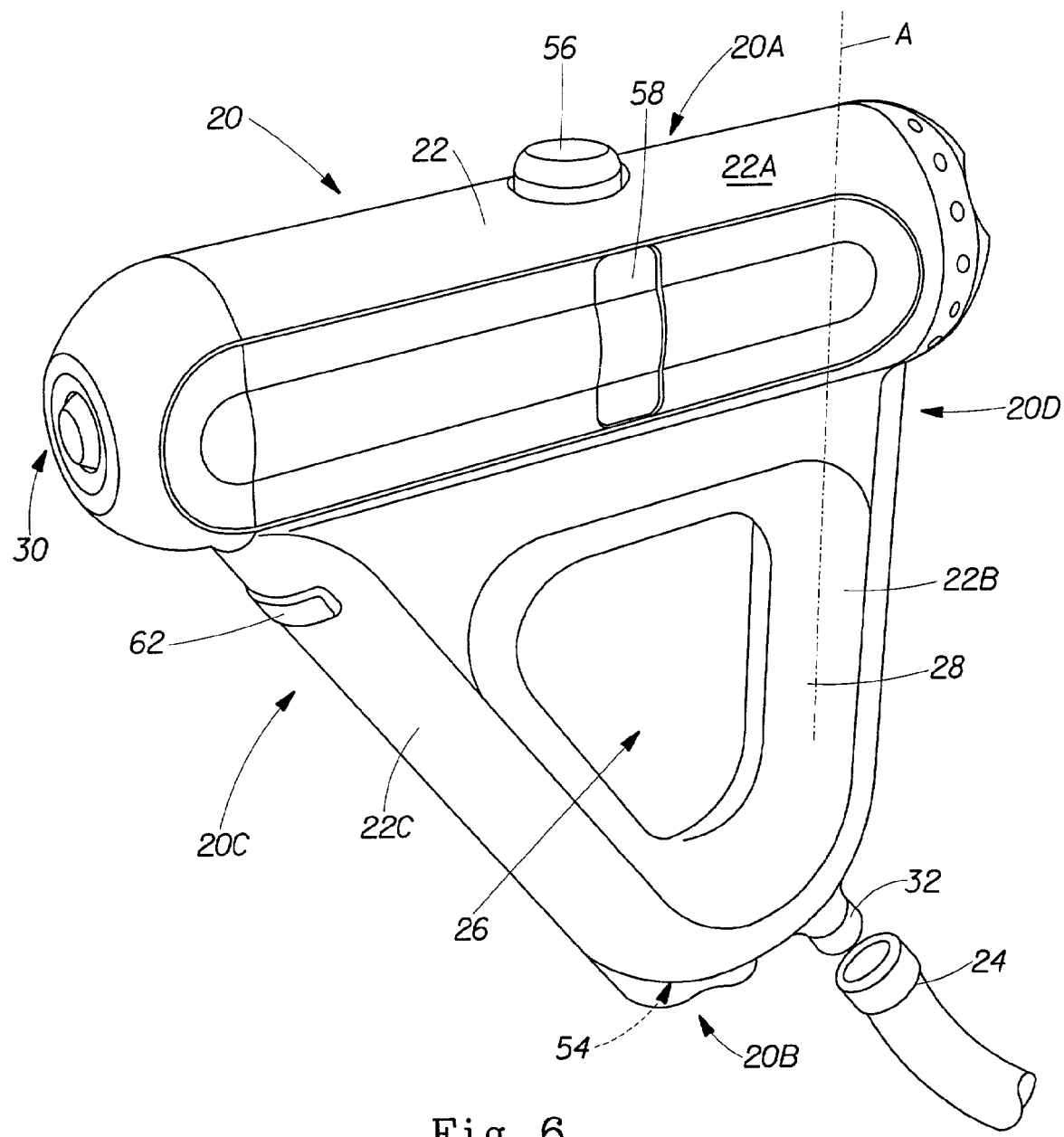
FIG. 6 is a perspective view of a sprayer in which the water purifier may be used.
Figure 7:
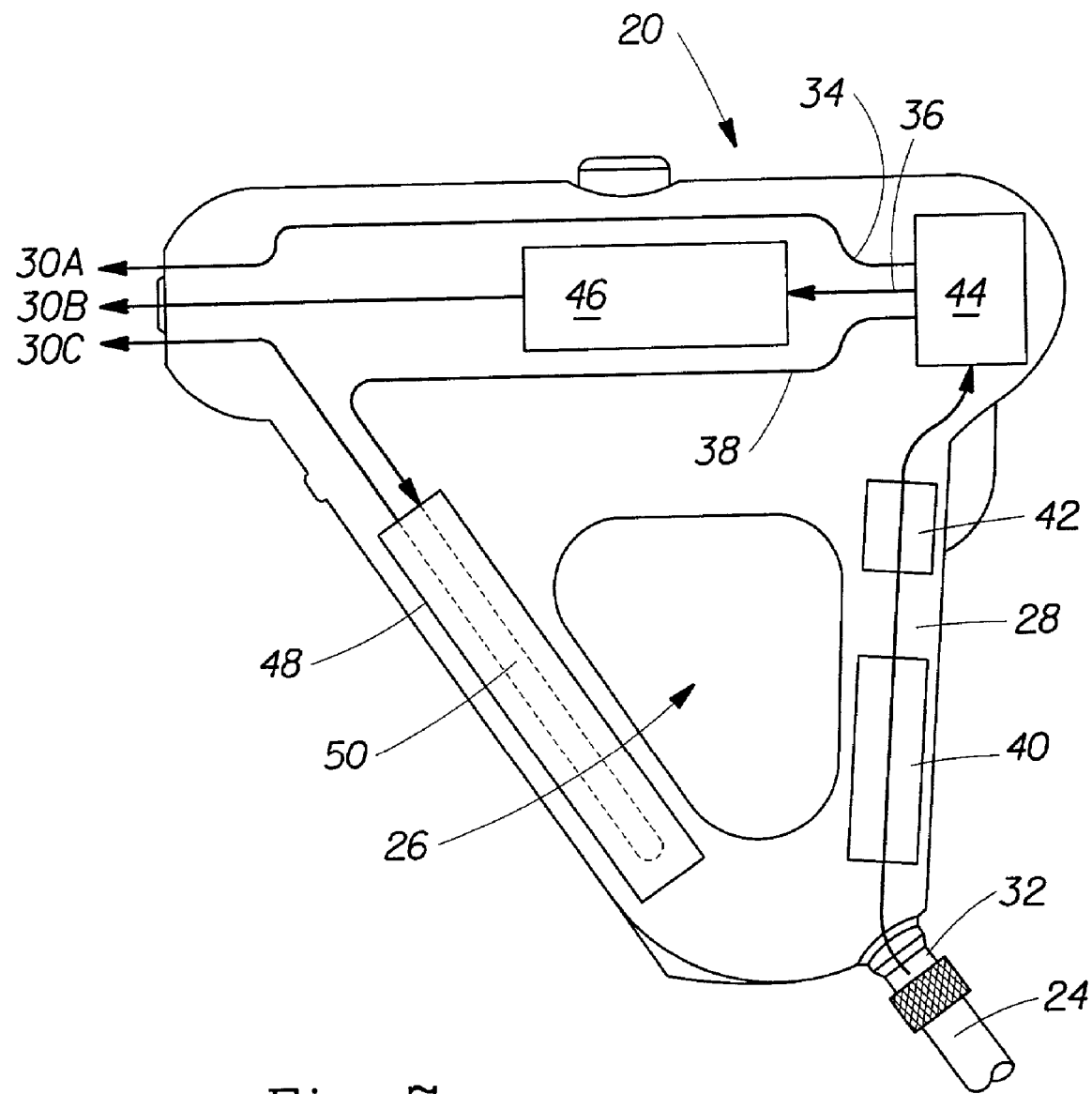
FIG. 7 is a schematic side view of the interior of the sprayer shown in FIG. 6.

As shown in FIGS. 6 and 7, this embodiment of the sprayer 20 has a generally triangular shape (and more particularly, a right triangular shape) when viewed from the side. FIG. 2 shows that the sprayer 20 has an upper portion 20A, an opposed lower portion 20B that is generally oriented toward the ground when the sprayer is in operation, a front portion 20C that is oriented toward the surface to be sprayed when the sprayer is in operation, and an opposed rear portion 20D.

The sprayer 20 comprises a housing or structure 22. The housing 22 has three portions: first portion 22A, second portion 22B, and third portion 22C that form the triangular shape. Preferably water flows through the housing 22 when the sprayer 20 is connected to a hose 24 and is in use. The housing 22 has a generally centrally located opening 26 and a handle 28 for gripping by a user. The handle has an axis, A. The sprayer further comprises at least one spray nozzle 30 that is operatively connected to the housing 22, and a hose connection (or simply "connection") 32 for the hose 24.

FIG. 3 shows that in this embodiment, the sprayer 20 may also comprise one or more conduits (or flow channels or flow paths) through which water may flow. Preferably, in the embodiment shown, the sprayer housing 22 comprises three flow paths 34, 36, and 38. The sprayer 20 may also comprise a flow regulator 40, an on/off switch 42, a flow selector 44, a compartment 46 for a composition to be dispensed (such as the cleaning composition), a compartment 48 for a filter, and a filter 50. This embodiment of the sprayer 20 has three nozzles comprising first nozzle 30A, second nozzle 30B, and third nozzle 30C.

The flow selector of the sprayer 20 can have any suitable settings, and any suitable number of settings. For instance, in one non-limiting embodiment, the flow selector may have settings for one or more of the following: "wash", "normal rinse", "purified rinse", and "finish coat". Of course, the flow selector need not include all of these settings, and other suitable names can be used for any of these steps. The selector valve system comprises any system which allows the user to select different settings on the device. Preferably, the valve system is capable of facilitating the user's compliance with a defined wash and rinse process comprising at least a washing step, an unpurified water rinsing step and a purified water rinsing step.

As noted above, in other embodiments, other types of sprayers can be used instead of the sprayer described above. The spraying device may be manually or electrically powered. Manually operated spraying devices include trigger-operated spray dispenser or pump-operated spray dispenser. In still other embodiments, the sprayer could be an electrostatic sprayer. In these or other embodiments, additional sprayers can be used to carry out the method of the present invention. If more than one sprayer is used, the sprayers may be the same type of sprayer, or different types of sprayers. In still other embodiments, the method of the present invention can be carried without using a sprayer at all, and using some other type of application device instead, including but not limited to a sponge with soap in a bucket containing water.

Preferably, however, a sprayer is used. If a sprayer is used, one or more sprayers may be used to carry out one or more of the steps of: applying a cleaning solution to the surface of a vehicle; rinsing the surface of the vehicle to remove at least some of the cleaning solution; rinsing the surface of the vehicle with purifed rinse water; and, applying a treating composition to the surface of the vehicle. In one non-limiting embodiment, the sprayer described above is used for at least the steps of: applying a cleaning solution to the surface of a vehicle; rinsing the surface of the vehicle to remove at least some of the cleaning solution; and, rinsing the surface of the vehicle with purified rinse water. In such an embodiment, a separate electric sprayer can be used to carry out the step of applying a treating composition to the surface of the vehicle.

C. The Cleaning Composition

If desired, a surface to be treated with purified water may be first cleaned using a suitable cleaning composition. The cleaning composition can be any suitable composition that is capable of cleaning the surface in issue. Preferably, the cleaning composition leaves the surface as free from residue as possible. In certain preferred embodiments, the cleaning composition is capable of rendering the surface hydrophilic. In other embodiments, the cleaning composition can modify the surface in other manners, such as by leaving the surface hydrophobic. By the term "hydrophilic", it is meant that the surface has an affinity for water. Because of the affinity between water and the surface, water spreads out on the surface to maximize contact. The higher the hydrophilicity, the greater the spread and the smaller the contact angle. Hydrophilicity can be determined by measuring the contact angle between the surface and a droplet of water on the surface. Contact angle is measured according to the American Standard Test Method for measuring contact angle, designation number D5725-95 using the apparatus commercially sold under the trade name Contact Angle Measuring System G10 by Kruss USA, Charlotte, N.C., USA.

In one embodiment of the present invention, the surface after treatment with the cleaning composition has a contact angle of less than or equal to about 80°, or a contact angle less than, or less than or equal to, any number of degrees less than 80° (all of which numbers are incorporated herein even though not specifically listed herein, for example, 50°, 40°, 35°, 30°, 20°, etc.) with the lower contact angles being more preferred.

In one non-limiting embodiment, the cleaning composition comprises a polymer which is capable of rendering the surface cleaned hydrophilic. The polymer may be a "surface substantive polymer" meaning that it is capable of modifying the surface by adhering or in some way associating with the surface to be cleaned such that it preferably remains on the surface during and after the cleaning process. Such adhesion or association may be for example by: covalent interaction; electrostatic interaction; hydrogen bonding; or van der waals forces. The polymer modifies the surface by rendering it hydrophilic. In a preferred version of such an embodiment, the polymer is preferably also capable of semi-durably modifying the surface to render it hydrophilic. By "semi-durably" it is meant that the hydrophilic surface modification is maintained for at least one rinse with water. A non-limiting example of such a suitable cleaning composition is provided in the Examples section below.

The polymer used in these embodiments of the cleaning composition may be a homo or copolymer. In one embodiment, the polymer comprises at least one hydrophobic or cationic moiety and at least one hydrophilic moiety. The hydrophobic moiety may include, but is not limited to an aromatic, $C_{8-18}$ linear or branched carbon chain, vinyl imidazole or a propoxy group. Cationic moieties include any group that is positively charged or has a positive dipole. The hydrophilic moiety may be selected from any moiety that forms a dipole which is capable of hydrogen bonding. Suitable examples of such hydrophilic moieties include vinyl pyrrolidone, carboxylic acid, such as acrylic acid, methacrylic acid, maleic acid, and ethoxy groups.

In certain non-limiting embodiments of the invention, water soluble or water dispersible polymers are used in the cleaning composition to hydrophilically modify the surface. Water soluble polymers and copolymers may include those in which at least one segment or group of the polymer comprises functionality that serves to modify or enhance the hydrophilicity of the polymer or the adsorption of the polymer to the surface. Examples of the hydrophilizing segments or groups include: water soluble polyethers; water soluble polyhydroxylated groups or polymers, including saccharides and polysaccharides; water soluble carboxylates and polycarboxylates; water soluble anionic groups such as carboxylates, sulfonates, sulfates, phosphates, phosphonates and polymers thereof; water soluble amines, quaternaries, amine oxides, pyrrolidone, and polymers thereof; water soluble zwitterionic groups and polymers thereof; water soluble amides and polyamides; and water soluble polymers and copolymers of vinylimidazole and vinylpyrrolidone. Additionally, the water soluble polymer may include quaternized vinylpyrrolidone/dialkylaminoalkyl acrylate or methacrylate copolymers. Examples of the adsorption enhancing segment or group include but are not limited to the following: the segment or group of the polymer that comprises functionality that serves to modify or enhance the hydrophilicity, or segments or groups that include: aromatic, C8-18 linear or branched carbon chains, vinyl imidazole or a propoxy group, alkylene, and aryl groups, and polymeric aliphatic or aromatic hydrocarbons; fluorocarbons and polymers comprising fluorocarbons; silicones; hydrophobic polyethers such as poly(styrene oxide), poly(propylene oxide), poly(butene oxide), poly(tetramethylene oxide), and poly(dodecyl glycidyl ether); and hydrophobic polyesters such as polycaprolactone and poly(3-hydroxycarboxylic acids).

In certain non-limiting, but preferred embodiments, the polymer is selected from the group consisting of copolymers of polyvinyl pyrrolidone. A particularly preferred copolymer of polyvinyl pyrrolidone is N-vinylimidazole N-vinylpyrrolidone (PVPVI) polymers available from for example BASF under the trade name LUVITEC™ VP155K18P. Preferred PVPVI polymers have an average molecular weight of from about 1,000 to about 5,000,000, more preferably from about 5,000 to about 2,000,000, even more preferably from about 5,000 to about 500,000 and most preferably from about 5,000 to about 15,000. Preferred PVPVI polymers comprise at least about 55%, preferably at least about 60% N-vinylimidazole monomers. Alternatively, another suitable polymer may be a quaternized PVPVI, for example, the compound sold under the tradename LUVITEC™ Quat 73W by BASF.

Other suitable copolymers of vinylpyrrolidone for use in the cleaning composition are quaternized vinylpyrrolidone/dialkylaminoalkyl acrylate or methacrylate copolymers. The quaternized vinylpyrrolidone/dialkylaminoalkyl acrylate or methacrylate copolymers suitable for use in the cleaning composition have the following formula:

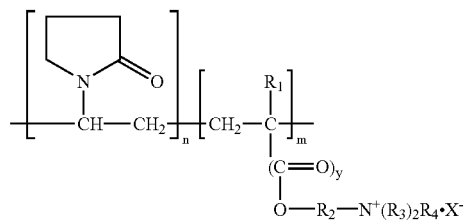

in which n is between 20 and 99 and preferably between 40 and 90 mol % and m is between 1 and 80 and preferably between 5 and 40 mol %; $R_1$ represents H or $CH_3$; y denotes 0 or 1; $R_2$ is —$CH_2$—CHOH—$CH_2$— or $C_xH_{2x}$, in which x=2 to 18; $R_3$ represents a lower alkyl group of from 1 to 4 carbon atoms, preferably methyl or ethyl, or

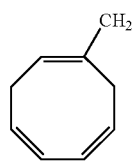

$R_4$ denotes a lower alkyl group of from 1 to 4 carbon atoms, preferably methyl or ethyl; $X^-$ is chosen from the group consisting of Cl, Br, I, $1/2SO_4$, $HSO_4$ and $CH_3SO_3$. The polymers can be prepared by the process described in French Pat. Nos. 2,077,143 and 2,393,573.

The preferred quaternized vinylpyrrolidone/dialkylaminoalkyl acrylate or methacrylate copolymers for use in the cleaning composition have a molecular weight of between about 1,000 and about 1,000,000, or any narrower range or amount that is included within the above range (including but not limited to between about 10,000 and about 500,000 and between about 10,000 and about 100,000). The average molecular weight range is determined by light scattering as described in Barth H. G. and Mays J. W. Chemical Analysis Vol 113, "Modem Methods of Polymer Characterization". Such vinylpyrrolidone/dialkylaminoalkyl acrylate or methacrylate copolymers are commercially available under the name copolymer 845®, GAFQUAT 734®, or GAFQUAT 755® from ISP Corporation, New York, N.Y. and Montreal, Canada or from BASF under the tradename LUVIQUAT®. Also preferred herein are quaternized copolymers of vinyl pyrrolidone and dimethyl aminoethymethacrylate (polyquaternium-11) available from BASF. Another preferred polymer is polyvinyl pyridine N-oxide (PVNO) polymer available from, for example Reilly. Preferred PVNO polymers have an average molecular weight of about 1,000 to about 2,000,000, more preferably from about 5,000 to about 500,000, most preferably from about 15,000 to about 50,000, or any narrower range or amount that is included within the above ranges (including but not limited to, up to about 40,000). The polymer is preferably present in the cleaning composition at a level of from about 0.001% to about 10% by weight of the cleaning composition, or any narrower range or amount within this range (including but not limited to between about 0.01% to about 5%, and between about 0.01% to about 1%).

In another non-limiting embodiment, the cleaning composition comprises at least one water-soluble or water-dispersible copolymer comprising, in the form of polymerized units:

(a) at least one monomer compound of general formula I:

$$H_2C=\overset{R_1}{\underset{}{C}}-Z-[CH_2]_n-\overset{X^-}{\underset{R_3}{\overset{R_2}{N^+}}}-[A-\overset{X^-}{\underset{R_3}{\overset{R_2}{N^+}}}]_m-B-\overset{X^-}{\underset{R_6}{\overset{R_4}{N^+}}}-R_5$$

in which:

$R_1$ is a hydrogen atom or a methyl or ethyl group;

$R_2$, $R_3$, $R_4$, $R_5$ and $R_6$, which are identical or different, are linear or branched $C_1$-$C_6$, preferably $C_1$-$C_4$, alkyl, hydroxyalkyl or aminoalkyl groups;

m is an integer from 0 to 10, preferably from 0 to 2;

n is an integer from 1 to 6, preferably from 2 to 4;

Z represents a —C(O) O— or —C(O) NH— group or an oxygen atom;

A represents a $(CH_2)_p$ group, p being an integer from 1 to 6, preferably from 2 to 4;

B represents a linear or branched $C_2$-$C_{12}$, advantageously $C_3$-$C_6$, polymethylene chain optionally interrupted by one or more heteroatoms or heterogroups, in particular O or NH, and optionally substituted by one or more hydroxyl or amino groups, preferably hydroxyl groups;

X, which are identical or different, represent counterions;

(b) at least one hydrophilic monomer carrying a functional group with an acidic nature which is copolymerizable with (a) and which is capable of being ionized in the application medium;

(c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b).

The above polymer compound is described further in PCT Publication WO 01/05920 A1 filed by Rhodia Chimie on Jun. 19, 2000. The above polymer compound is obtained as proprietary polymer DV6573 from Rhodia Chimie, Courbevoie, Cedex, France, and can be present in the cleaning composition, or, if desired, in a rinse composition. An example of a suitable composition containing this polymer compound is provided in the Examples section of this specification.

In another non-limiting embodiment, the cleaning composition comprises at least one water-soluble or water-dispersible copolymer comprising, in the form of polymerized units:

(a) at least one monomer compound of general formula II:

$$H_2C=\overset{R_1}{\underset{}{C}}-\underset{O}{\overset{}{\overset{\parallel}{C}}}NH-[CH_2]_n-\overset{R_2}{\underset{R_4}{\overset{}{N^+}}}-R_3 \quad X^-$$

in which:

$R_1$ is a hydrogen atom or a methyl group, preferably a methyl group;

$R_2$, $R_3$, and $R_4$, which are identical or different, are linear or branched $C_1$-$C_4$, alkyl groups;

n is an integer from 1 to 6, preferably from 2 to 4; in particular the number 3;

X represents a counterion which is compatible with the water-soluble or water-dispersible nature of the polymer;

(b) at least one hydrophilic monomer chosen from $C_3$-$C_8$ carboxylic acids containing monoethylenic unsaturation, anhydrides thereof and water-soluble salts thereof;

(c) optionally at least one hydrophilic monomer compound containing ethylenic unsaturation, of neutral charge, bearing one or more hydrophilic groups, which is copolymerizable with (a) and (b);

the average charge Q on the copolymer defined by the equation:

$$Q = \frac{[a] - [b]\Gamma}{[a]}$$

in which [a] represents the molar concentration of monomer (a);

in which [b] represents the molar concentration of monomer (b); and and $\Gamma$ represents the ratio of neutralization of monomers (b) defined by $$\Gamma = \frac{[COO^-]}{[COOH] + [COO^-]}$$

in which [COOH] and [COO$^-$] represent, respectively, the molar concentrations of monomers (b) in carboxylic acid and carboxylate form at the pH at which the composition is used, being greater than 0 and possibly going down to 0.4, advantageously down to 0.2. The molar ratio (a)/(b) is advantageously between 25/75 and 70/30.

The molar ratio c/(a+b+c) is advantageously between 0 and 40/100, preferably between 10/100 and 30/100.

The copolymer is preferably a random copolymer.

The above polymer compound is described further in PCT Publication WO 01/05922 A1 filed by Rhodia Chimie on Jun. 19, 2000 which is herein incorporated by reference.

In another non-limiting embodiment, the cleaning composition comprises at least one water-soluble or water-dispersible copolymer comprising, in the form of polymerized units:

(a) at least one monomer compound of general formula III:

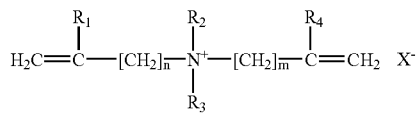

in which:
- $R_1$ and $R_4$ independently of each other, represent a hydrogen atom or a linear or branched $C_1$-$C_6$ alkyl group;
- $R_2$ and $R_3$, independently of each other, represent an alkyl, hydroxyalkyl or aminoalkyl groups in which the alkyl group is a linear or branched $C_1$-$C_6$ chain, preferably a methyl group;
- n and m are integers between 1 and 3;
- n is an integer from 1 to 6, preferably from 2 to 4;
- X, which may be identical or different, represent counterions which are compatible with the water-soluble or water-dispersible nature of the polymer;

(b) at least one hydrophilic monomer bearing a function of acidic nature which is copolymerizable with (a) and capable of ionizing in the application medium;

(c) optionally at least one hydrophilic monomer compound with ethylenic unsaturation and of neutral charge, bearing one or more hydrophilic groups, which is copolymerizable with (a) and (b);

in which the a/b molar ratio is between 60/40 and 5/95.

The above polymer compound is described further in PCT Publication WO 01/05921 A1 filed by Rhodia Chimie on Jun. 19, 2000 which is herein incorporated by reference.

In other non-limiting embodiments, the polymer may comprise one or more of the following: SEDIPUR® acrylamid-based cationic polymers available from BASF Aktiengesllschaft, Ludwigshafen, Germany, including but not limited to the following series of SEDIPUR® polymers: CF 104, CF 403, CF 803, CL 520, CL 541, CL 542, CL 851, CL 952, and NF 104; lignin sulfonates such as REAX® 83A and REAX® 100M available from Westavco; polyquaterniums such as #'s 2, 7, 32, 33, and 47 available from various suppliers; SALCARE® polymers available from CIBA Specialty Chemicals, Inc., including SALCARE® SC60, a cationic acrylic copolymer (I.N.C.I. designation acrylamidopyltrimonium chloride/acrylamide copolymer); MERQUAT® polymers available from Ondeo Nalco Company; TRAMFLOC® polymers available from Tramfloc, Inc.; and ZETAG® cationic polyacrylamides available from CIBA.

The cleaning composition may comprise a variety of optional ingredients depending on the desired benefit and the type of surface to be cleaned. Suitable optional ingredients for use herein can be selected from the group comprising: anti-resoiling ingredients, surfactants, clay, chelating agents, enzymes, hydrotopes, ions, suds control agents, solvents, buffers, thickening agents, radical scavengers, soil suspending polymers, pigments, dyes, preservatives and/or perfumes. Suitable ingredients for the cleaning compositions, particularly surfactants therefor, are described in U.S. Pat. Nos. 5,888,955, 6,172,021, and 6,281,181. The cleaning composition may (or may not) include other ingredients, such as those specified below for the treating composition (including, but not limited to nanoparticles).

The cleaning composition may be in any form, for example, liquid, gel, foam, particulate or tablet. When the cleaning composition is a liquid, it may be aqueous or non-aqueous, dilute or concentrated. When the cleaning composition is aqueous, it preferably comprises from about 1% to about 99.9% water, more preferably from about 50% to about 99.8%, most preferably from about 80% to about 99.7% water. As mentioned, it is alternatively envisaged that the cleaning composition may be non-aqueous. By "non-aqueous", it is meant that the cleaning composition is substantially free from water. More precisely, it is meant that the cleaning composition does not contain any expressly added water and thus the only water that is present in the composition is present as water of crystallization for example in combination with a raw material. When the composition is in solid form, e.g. particulate or tablet, it is preferably dissolved in water prior to use.

Examples of alternative cleaning compositions can include: Turtle Wax Zip Wax Car Wash: Turtle Wax, Inc; Chicago, Ill. 60638; Meguiars' Gold Class Car Wash Shampoo and Conditioner: Meguiar's, Inc; Irvine, Calif. 92614; Armor All Car Wash Concentrate: The Armor All Products Corp. (Clorox); Oakland, Calif. 94612; and Blue Coral Wash and Wax Concentrate: Blue Coral-Slick 50, Ltd.; Cleveland, Ohio 44105.

The cleaning composition may have any suitable pH. In certain embodiments, it may be desirable for the cleaning composition to have a relatively neutral pH, for example, a pH of between about 3 and 10.

D. The Treating (Finishing/Coating) Composition

The treating (or finishing or coating) composition comprises a hard surface coating composition comprising a plurality of non-photoactive nanoparticles. The treating composition may be referred to as a finishing composition since it may be the last substance that is applied to the surface. It may also be referred to as a coating composition since it may be applied by coating the surface. Such a coating composition may comprise: (a) an effective amount of non-photoactive nanoparticles; (b) one or more surfactants; (c) optionally one or more adjunct ingredients; and (d) optionally a suitable carrier medium. The coating composition is preferably aqueous, and is substantially free from pigments and opacifiers, and no masking is applied to non-painted surfaces of the vehicles to which it is applied. It should be understood, however, that the coating composition is not limited to coating compositions that contain the ingredients listed above, and that suitable coating compositions may omit some of these ingredients, or contain additional ingredients (such as photoactive nanoparticles).

Examples of alternative treating or finishing compositions include: Turtle Wax Super Hard Shell Car Wax Turtle Wax, Inc; Chicago, Ill. 60638; Meguiars' Gold Class Clear Coat Liquid Car Wax: Meguiar's, Inc; Irvine, Calif. 92614; and, Armor All Car Wax Diamond Hard Shine: The Armor All Products Corp. (Clorox); Oakland, Calif. 94612.

III. The Method

In one non-limiting embodiment, the method comprises a method for cleaning and treating a surface of a vehicle. The term "vehicle", as used herein, includes any type of vehicle known, and includes, but is not limited to automobiles, trucks, trains, aircraft, and watercraft. It should be understood that the method described below is merely illustrative. The surfaces of vehicles are illustrated because they often include cured painted surfaces, cured clearcoat surfaces, and glass surfaces, and various combinations of these different types of surfaces. Such surfaces are often some of the most unforgiving types of surfaces from the standpoint of their tendency to be left with visible watermarks and other types of residue. Thus, if the present method works well on such surfaces, it will generally work well on the other types of surfaces specified herein. The present invention can be used to clean and treat many other types of surfaces other than the surfaces of vehicles. The present invention is also not limited to the steps of the method described herein. In this embodiment, the method comprises the following steps.

A. Applying the Cleaning Solution to the Surface of a Vehicle

The cleaning composition can be applied to the surface in any suitable manner. The cleaning composition can either be applied directly to the surface, with or without any other steps. In one non-limiting embodiment, however, the cleaning composition is applied to the surface after an optional pre-wetting step. The composition can be applied using a cloth or sponge onto which the composition has been applied, or by pouring the composition over the surface. Alternatively, the composition may be applied to the surface by spraying the composition onto the surface using a spraying device. In one non-limiting embodiment, a spraying device, such as the sprayer shown in the drawings, is used to apply the cleaning composition to the surface of the vehicle.

B. Optional Step of Contacting the Surface of the Vehicle with the Cleaning Solution Thereon and Agitating the Cleaning Solution to Loosen Dirt on the Surface of the Vehicle The surface of the vehicle with the cleaning solution thereon can be contacted to agitate or scrub the cleaning solution to loosen dirt on the surface of the vehicle. This can be done in any manner known in the art. In one non-limiting embodiment, a sponge is used to wipe the surface of the vehicle and agitate the cleaning solution to loosen dirt on the surface of the vehicle.

C. Rinsing the Surface of the Vehicle to Remove at Least Some of the Cleaning Solution Once the cleaning composition has been applied to the surface, the surface is then rinsed. The surface of the vehicle rinsed to remove at least some, and preferably substantially all of the cleaning solution (other than any portion of the cleaning solution which is desirable to leave on the surface to provide modified properties (e.g., hydrophobic or hydrophilic)). The surface of the vehicle can be rinsed in any manner known in the art, including but not limited to using a hose. In one non-limiting embodiment, the surface of the vehicle is rinsed using a spraying device, such as the sprayer shown in the drawings. The spraying device can be set on the "normal rinse" setting and rinsed with tap water.

D. Rinsing the Surface of the Vehicle with Purifed Rinse Water

At least some to all of the residue-forming substances are removed from the surface of the vehicle by rinsing the surface of the vehicle with purified rinse water. The rinse of purified rinse water can be delivered by any suitable means but is preferably, for convenience, delivered to the surface using a hose-end spray device. In one non-limiting embodiment, the surface of the vehicle is rinsed using a spraying device, such as the sprayer shown in the drawings. The spraying device can be set on the "purified rinse" setting and rinsed with purified water.

In certain embodiments, an unusual phenomena is seen when rinsing the surface of the vehicle with purified rinse water. During the step of rinsing the surface of the vehicle with purified rinse water, a large number (e.g., a plurality or multiplicity) of small air bubbles or water droplets (either of which may be referred to herein as "beads") appear on the surface of the vehicle. These air bubbles or water droplets continuously form over the entire surface of the vehicle which is contacted with the purified rinse water and continuously sheet off the surface during the step of rinsing the surface of the vehicle with purified rinse water.

A particular benefit of using purified rinse water in the process is that when the surface is cleaned and then rinsed using purified rinse water, there is no need to wipe the surface dry or to use forced air to dry the surface. The surface rinsed with purified rinse water will be substantially free of water spots or streaks. This makes the use of purified rinse water in the method particularly advantageous for hand washing vehicles, since it is much less labor-intensive and energy-intensive than towel drying and forced air drying, respectively.

In an alternative embodiment, any of the polymers described herein can be added to the normal rinse water, the purified rinse water, or both. Incorporating the polymers into the rinse water may be used to provide the desired hydrophilic coating on the surfaces of the vehicle.

E. Optional Step of Applying a Treating Composition Comprising an Effective Amount of Non-Photoactive Nanoparticles to the Surface of the Vehicle The treating (or coating) composition comprising the non-photoactive nanoparticles may then be applied to the surface of the vehicle. The treating composition can be applied to the surface of the vehicle while the vehicle is still wet from the purified rinse water, or when the surface of the vehicle is dry. The treating composition can be applied to the surface of the vehicle in any suitable manner including, but not limited to pouring, wiping (such as with a sponge, cloth, or the like), and spraying. This optional step is useful in extending the life of the hydrophilic surface, increasing surface shine, and eliminating waxing, if so desired.

Suitable non-photoactive nanoparticles include, but are not limited to LAPONITE® B and RD nanoparticles available from Laporte Industries/Southern Clay Products, Inc., Gonzales, Tex.

EXAMPLE(S)

Soap Formulation Examples:

| Ingredient | Formula % Solids | Raw Material % Solids | Raw Material % Of Formulation |
|---|---|---|---|
| Surfactant (*1) | 13.00 | 50 | 26.0 |
| Polymer (*2) | 5.25 | 20 | 26.25 |
| Aesthetics, pH Adjust & Water | | | Balance |

(*1) Cognis PLANTAREN 2000 N or Rhodia MIRATAINE CBS
(*2) Rhodia DV6573 or BASF SEDIPUR ® CL 520

Test Methods

Unless otherwise stated, all tests are performed under standard laboratory conditions (50% humidity and at 73° F. (23° C.)).

The test water that is fed into the purifier to determine the performance of the same in terms of the conductivity of the treated water is as follows:

| Test Water Preparation | Formula % | PPM In Test Water |
|---|---|---|
| DI Water | Balance | Ca = 50 |
| Calcium Chloride Dihydrate | 0.018340 | Mg = 20 |
| Potassium Nitrate | 0.001293 | Na = 75 |
| Magnesium Sulfate Heptahydrate | 0.020280 | K = 5 |
| Sodium Sulfate | 0.003099 | $SO_4$ = 100 |

-continued

| Test Water Preparation | Formula % | PPM In Test Water |
|---|---|---|
| Sodium Bicarbonate | 0.023750 | Cl = 88 |
| | | HCO$_3$ = 173 |
| | | NO$_3$ = 8 |

Test Water Attributes
Conductivity=~765 micromho
TDS=519 PPM
Hardness TDS As CaCO3=207.2
Other TDS As CaCO3=169.7
Total TDS As CaCO3=376.9 (both cations & anions)
Equivalents/gallon=0.0285 (both cations & anions)
Anion non-bicarbonate equivalents are 62.3%
Anion divalent equivalents (non-bicarbonate) are 44.3%

The present invention is not limited to methods that include steps for both cleaning and treating surfaces. The method of the present invention can comprise a purified rinse step alone, or in combination with one or more steps of cleaning, treating, and tap water rinsing of a surface. Any portions or steps of the method described herein may comprise inventions in their own right without regard to the other steps described herein.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

While particular embodiments of the subject invention have been described, it will be obvious to those skilled in the art that various changes and modifications of the subject invention can be made without departing from the spirit and scope of the invention. In addition, while the present invention has been described in connection with certain specific embodiments thereof, it is to be understood that this is by way of illustration and not by way of limitation and the scope of the invention is defined by the appended claims which should be construed as broadly as the prior art will permit.

What is claimed is:

1. A portable water purifying device in combination with a spray device, said spray device removably attached to an end of a hose which is attached to a supply of tap water, said portable water purifying device positioned in said spray device and comprising:

a portable purifier cartridge comprising a sequential arrangement of at least a first bed of a SAC ion exchange resin having a length from 5 inches to 7 inches followed by a second bed of a WBA ion exchange resin having a length from 4 inches to 6 inches, and, optionally, followed by one or more additional beds of ion exchange resins selected from the group consisting of SAC ion exchange resins, WBA ion exchange resins, SBA ion exchange resins, WAC ion exchange resins, and mixtures thereof;

wherein said portable purifier cartridge comprises ion exchange resin beads that are less than 0.6 mm in diameter; and wherein said tap water flows from said hose into said spray device and into said portable water purifying device and through said portable purifier cartridge at a flow rate of greater than 14 gallons/minute/ft$^3$ of the total volume of ion exchange resin and effluent water having a conductivity of less than or equal to about 50 micromho is provided for spraying from said spray device.

2. The purifying device of claim 1 wherein water flows through said portable purifier cartridge at a flow rate of greater than or equal to about 20 gallons/minute/ft$^3$.

3. The purifying device of claim 1 wherein said portable purifier cartridge has a total volume of ion exchange resin between about 5 in$^3$ and about 25 in$^3$.

4. The purifying device of claim 1 wherein said first bed and said second bed differ in the size of cross-sectional area, aspect ratio, or both.

5. The purifying device of claim 1 wherein the WBA ion exchange resin comprises a crosslinked copolymer of acrylate containing amino groups.

6. The purifying device of claim 1 wherein the WBA ion exchange resin has a capacity greater than or equal to about 1.1 eq./L.

7. A method of washing a surface using the purifying device of claim 1, said method comprising the steps of (a) washing a surface; and (b) rinsing the surface, wherein the surface is rinsed during at least one rinse step, and the sole rinse step, if there is only one rinse step, or the last rinse step, if there is more than one rinse step, comprises a final rinse, wherein the purifying device is used to rinse the surface with purified water in the final rinse of the process of washing a surface.

8. A method of treating a surface with a surface modifying substance using the purifying device of claim 1, said method comprising the steps of (a) treating a surface with a surface modifying substance that reduces the contact angle of water with the surface to less than about 50 degrees; and (b) (1) rinsing said surface treated with said surface modifying substance with purified water using said purifying device, or (2) rinsing said surface with purified water using said purifying device prior to treating said surface with said surface modifying substance.

9. The purifying device of claim 1 wherein water flows through said portable purifier cartridge at a flow rate of greater than or equal to about 27 gallons/minute/ft$^3$.

10. The purifying device of claim 1 wherein at least some of the ion exchange resin is in the form of beads of less than 0.4 mm in diameter.

11. The purifying device of claim 1 wherein at least one of said resin types comprises a visual indicator to determine depletion of resin exchange capacity.

12. The method of washing a surface of claim 7 wherein the surface is at least a portion of the exterior surface of a vehicle.

13. A portable purifying device for use in an end of the hose water purifier, said purifying device positioned in water purifier and comprising a portable article containing ion exchange resin having a total volume and a length where the water flows from the end of a garden hose into the end of the hose water purifier and into the portable article having a sequential arrangement consisting of a first bed of SAC ion exchange resin and second bed of WBA ion exchange resin at a flow rate of greater than 14 gallons/minute/ft$^3$ of the total volume of ion exchange resin, wherein said ion exchange resins comprise resin beads that are less than 0.4 mm in diameter and the WBA ion exchange resin comprises a crosslinked copolymer of acrylate containing amino groups and wherein said first bed has a length from 5 inches to 7 inches and said second bed has a length from 4 inches to 6 inches.

* * * * *

UNITED STATES PATENT AND TRADEMARK OFFICE
CERTIFICATE OF CORRECTION

PATENT NO. : 7,381,279 B2
APPLICATION NO. : 10/137748
DATED : June 3, 2008
INVENTOR(S) : Bruce Barger et al.

It is certified that error appears in the above-identified patent and that said Letters Patent is hereby corrected as shown below:

Column 5

Table

Delete the table as it appears in the published patent

"

|   | α | β | χ | δ | ε | φ |   |
|---|---|---|---|---|---|---|---|
| SAC | -0.22968 | -0.33667 | -0.20799 | 0.79143 | 1.17665 | -3.46935 |   |
| WBA | 5.51754 | -4.96870 | 0.587 | -14.42188 | 2.98122 | 0 |   |
| PD SAC[1] | -6.1955 | 1.4442 | 0.5238 | 37.5011 | 0 | -14.9159 |   |
| PD WBA[2] | -10.4561 | 1.3835 | 1.4888 | 65.9314 | 0 | 0 | -27.6311 |

"

and insert the table as it appears in the Amendment to the Specification

|   | α | β | χ | δ | ε | φ | γ |
|---|---|---|---|---|---|---|---|
| SAC | -0.22968 | -0.33667 | -0.20799 | 0.79143 | 1.17665 | -3.46935 | 0 |
| WBA | 5.51754 | -4.96870 | 0.587 | -14.42188 | 2.98122 | 0 | 0 |
| PD SAC[1] | -6.1955 | 1.4442 | 0.5238 | 37.5011 | 0 | -14.9159 | 0 |
| PD WBA[2] | -10.4561 | 1.3835 | 1.4888 | 65.9314 | 0 | 0 | -27.6311 |

--.

Column 6

Line 67, delete "44000H" and insert -- 4400OH --.

Line 67, delete "A4000H" and insert -- A400OH --.

UNITED STATES PATENT AND TRADEMARK OFFICE
CERTIFICATE OF CORRECTION

PATENT NO.         : 7,381,279 B2
APPLICATION NO.    : 10/137748
DATED              : June 3, 2008
INVENTOR(S)        : Bruce Barger et al.

It is certified that error appears in the above-identified patent and that said Letters Patent is hereby corrected as shown below:

Column 8

Line 23, delete "gailons/minute/ft³".

Line 31, delete "CaCO" and insert -- $CaCO_3$ --.

Line 31, delete "CaCO" and insert -- $CaCO_3$ --.

Line 36, delete "ha.s" and insert -- has --.

Column 12

Line 54, delete "Modem" and insert -- Modern --.

Column 20, Claim 13

Line 63, after "in" insert -- said --.

Signed and Sealed this

Seventeenth Day of November, 2009

David J. Kappos
*Director of the United States Patent and Trademark Office*